Patented Jan. 9, 1945

2,367,072

UNITED STATES PATENT OFFICE 2,367,072

AZO DYESTUFFS AND THEIR MANUFACTURE

Jack T. Thurston, Riverside, Conn., assignor to American Cyanamid Company, New York, N. Y., a corporation of Maine No Drawing. Application February 26, 1943, Serial No. 477,275

12 Claims (Cl. 260—204)

This invention relates to new azo dyestuffs and to their preparation.

In the copending application of Donald W. Kaiser and Jack T. Thurston, Serial No. 445,206, filed May 30, 1942, there is disclosed the preparation of aromatic carbonyl dicyandiamides, a group of new compounds. In the copending application of the same inventors, Serial No. 438,573, filed April 11, 1942, there is disclosed the preparation of aromatic sulfonyl dicyandiamides, also new compounds. I have discovered that certain of the aromatic acyl dicyandiamides described in these applications and further described herein, can be converted into a new class of azo dyestuffs having valuable properties.

The dyestuffs of the present invention may be represented by the general formula.

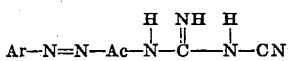

in which Ar is an aromatic radical and Ac is an aromatic acyl radical. Both Ar and Ac may contain various types and kinds of substituent groups as will be shown hereinafter.

Azo dyes having the above general formula may be prepared by diazotizing an aromatic acyl dicyandiamide which contains an amino group in the aromatic ring and then coupling it with an aromatic coupling component containing an amino or hydroxyl group attached to the aromatic ring through the diazoic group. Among the aromatic acyl dicyandiamides which may be diazotized and coupled with aromatic components to form new dyes are those such as p-aminobenzoyldicyandiamide, m - aminobenzoyldicyandiamide, 3-amino-5-hydroxybenzoyldicyandiamide, 4-amino-α-naphthoyldicyandiamide, 5-amino-β-naphthoyldicyandiamide, aminophenylacetyldicyandiamide, aminophenylstearoyldicyandiamide, β-(4-aminophenyl)-propionyldicyandiamide, m-aminocinnamyldicyandiamide, p-aminobenzene sulfonyldicyandiamide, m-aminobenzene sulfonyldicyandiamide, 4-amino-α-naphthene sulfonyldicyandiamide, aminophenoxyethylsulfonyldicyandiamide, 4-(4'-amino-2'-nitrophenyl)-butene-3-oyldicyandiamide, 3-(4'-amino-2'-nitrophenyl) - allylsulfonyldicyandiamide, 2-naphthylamine-3,6-disulfonyldicyandiamide, 4-aminophthaloyl-bis-dicyandiamide, 2-amino-8-naphthal-6-sulfonyldicyandiamide, 1 - amino-8-naphthal-4-sulfonyldicyandiamide, 2-(4'-aminobenzoyl)-benzoyldicyandiamide, 3-aminophenoxy acetyldicyandiamide, 3-aminophenoxydiethoxy-acetyldicyandiamide, and the like. These aromatic acyl dicyandiamides are prepared by reacting dicyandiamide with a suitable nitro or amino aryl carbonyl or sulfonyl chloride in the presence of a strong alkali.

When these compounds are diazotized and made into dyes having the above formula the aromatic acyl radical Ac has the following, and other related structures:

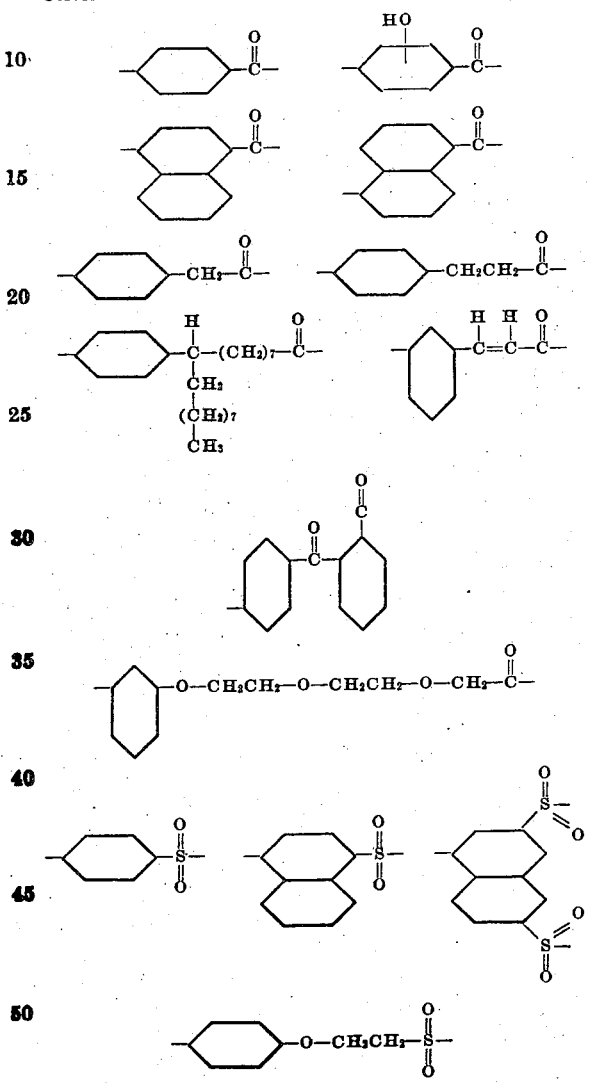

etc. These groups may be further substituted with alkyl, aryl, cycloalkyl, halide, hydroxy, nitro, cyano, sulfo, sulfamido, carboxy, carbamyl, carbonyl, amino and other kinds of radicals. Accordingly, a great variety of different dyes are made possible.

The diazotized amino aromatic acyl dicyandiamides may be coupled with aromatic amino or hydroxy compounds capable of azoic coupling. By "aromatic" I mean any cyclic compound, whether carbocyclic or heterocyclic, having conjugated bonds. Familiar compounds of this class are those belonging to the benzene, naphthalene, pyrazolone, carbazole, benzothiazole, 1,2,4-triazole, 3-hydroxyindol and other series. These compounds may be substituted with alkyl, aryl, cycloalkyl, halide, hydroxy, nitro, cyano, sulfo, sulfamido, carboxy, carbonyl, carbamyl, amino and other radicals as will appear from the specific compounds named below.

Specific instances of suitable coupling compounds of these types are: the hydroxy benzenes and substituted hydroxy benzenes such as 1,3-dihydroxy benzene, 2,6-dihydroxybenzoic acid, 1,2,3-trihydroxy benzene, guaiacol, m-nitrophenol, chlorophenols, naphthols, aminonaphthols, naphthol sulfonic acids, phenolsulfonic acids, etc.; the amino benzenes and substituted amino benzenes such as aniline, metanilic acid, dimethylaniline, diethylaniline - m - sulfonic acid, ethylbenzylaniline, ethylbenzylaniline sulfonic acid, 1,3-diaminobenzene, ortho- and meta-toluidine, p-xylidine, 2,5-dihydroxyalkylaminobenzene, m-toluylenediamine, phenylazoaniline, 3-aminophenol-6-sulfonic acid, o-methoxyaniline, p-ethoxyaniline, ortho-aminobenzoic acid, etc.; the hydroxy and amino naphthalenes such as α- and β-naphthols, α- and β-naphthylamines, the naphthylamine sulfonic acids, 1-naphthol-3-sulfonic acid, 1-amino-8-nitro-2-naphthol-4-sulfonic acid, 1,8-dihydroxynaphthalene-3,6-disulfonic acid, 1-chloro-8-naphthol-3,6-disulfonic acid, 2-naphthol-7-sulfonic acid, 2-amino-8-naphthol-6-sulfonic acid, 2-naphthol-6,8-disulfonic acid, 2-acetylamino-5-naphthol-7-sulfonic acid, 2-N-β-hydroxyethylamino - 8 - naphthol-6-sulfonic acid, 1,8-amidonaphthol-3,6-disulfonic acid, 7 - hydroxy-1-naphthyl-m-hydroxyphenylamine, etc.; the arylides of naphthoic acids as for example the benzidide of β-hydroxynaphthoic acid, 2-hydroxynaphthanilide, β-hydroxynaphthoic anilide, etc.; pyrazolones and pyrazyl pyrazolones such as 3-methyl-5-pyrazolone, 1-phenyl-3-methyl - 5 - pyrazolone, 1-(4'-sulfophenyl)-3-methyl-5-pyrazolone, 1-(2'-naphthyl)-3-methyl-5-pyrazolone-8'-sulfonic acid, and the like; ortho- and meta-hydroxybenzoyldicyandiamide, o-hydroxyphenoxyacetyldicyandiamide, aminohydroxybenzoyldicyandiamide, etc.; arylides of acetoacetic acid such as di-acetoacetictolidide, furoylacetic acid, hydroxydibenzothiophene carboxylic acids, etc.; and those condensation products of aryl amines with α-hydroxy methane sulfonic acids such as specifically N-o-methylphenyl-aminomethanesulfonic acid, etc.

By selecting appropriate coupling components it is possible to prepare dyes having particular utility in dyeing fabrics of cellulosic fibers such as cotton, viscose, cellulose esters and ethers, etc.; wool, silk, nylon and other natural and synthetic fibers. Dyes may be formed which are either acidic or basic in character. They may be formed having solubilizing groups, such as sulfonic or carboxyl groups, or not, as desired. Some of the dyes may be metallized with copper, chromium, iron, manganese, cobalt, nickel, etc., and made more stable. For example, when the radicals Ar and Ac each have hydroxyl groups, hydroxyl and carbonyl, hydroxyl and amino, or hydroxyl and carboxyl groups in ortho position to the azo bridge the dyes may be metallized. A typical metallizable dye of this type can be made by diazotizing p-amino-m-hydroxybenzoyldicyandiamide and coupling it with β-naphtholsulfonic acid in alkaline solution. The dyes of the present invention may also be employed in the preparation of printing inks, textile printing pastes, colored lacquers, colored plastic compositions, for dyeing paper and in other related fields.

Most of the new dyestuffs covered by the general formula

may also be prepared by coupling an amino or hydroxy aromatic acyl dicyandiamide to a diazotized aryl amine. Typical amines which can be diazotized and reacted with aromatic acyl dicyandiamides having activating groups thereon are the following: aniline and substituted anilines such as toluidine, 2,4-dimethylaniline, monofluoroaniline, monochloroanilines, 2,5-dichloroaniline, m-aminobenzotrifluoride, 2-methyl-3-chloroaniline, 2-methyl-4-chloroaniline, 2-methyl-5-chloroaniline, 2-methyl-4-chloro-5-bromoaniline, 4-methyl-2,5-dichloroaniline, 2-methyl-4-nitroaniline, 2-nitro-4-chloroaniline, etc.; ether derivatives of primary aromatic amines such as o-anisidine, 2-methoxy-5-methyl aniline, 2,5-dimethoxyaniline, 2 - methoxy - 1 - naphthylamine, 2-amino-diphenylether, 2-methoxy-5-chloroaniline, 3-bromo-6-ethoxyaniline, 4-amino-4'-chloro-diphenylether, 2-methoxy-4-nitroaniline, 2-methoxy-5-nitroaniline, 2-methoxy-4-nitro-5-methylaniline; monoacyl derivatives of aromatic diamines, such as, N-hexahydrobenzoyl-p-phenylenediamine, N-hexahydrobenzoyl-p-toluylenediamine, N-benzoyl-p-phenylenediamine; monoacyl derivatives of diamino-phenolethers, such as 2-benzoylamino-4-amino-anisole, 2-hexahydrobenzoylamino-5-amino-anisole, 2-amino-5-phenoxy-acetylamino-hydroquinone diethylether, the monomethyl, the monobenzyl and the monophenyl-urethane of 2,5-diamino-hydroquinone dimethylether and diethyl ether; 2,5-diamino-4-alkoxy-chlorobenzenes; monoacyl derivatives of diamino-p-chlorophenyl ethers, such as 2-amino-4-chloro-5-acetylamino-diphenylether; amino derivatives of aromatic sulfones such as 3-amino-4-methyl-diphenyl sulfone, 2-amino-4'-methyl-diphenyl sulfone; amino derivatives of aromatic dialkylsulfonamides such as N-dimethyl-(3-amino-4-methylbenzene)-sulfonamide and the N-diethylamide; amino diarylamines and their ether derivatives and their nitro derivatives such as 2-methoxy-5-amino-diphenylamine, 3,4'-dinitro-4-amino-diphenylamine; amino-azo compounds such as 3,2'-dimethyl-4-amino-azobenzene, and the like.

In addition to the above there are numerous aromatic diamines in which only one of the amino groups is diazotized. Such amino-diazo compounds may be reacted with amino and hydroxy aromatic acyl dicyandiamides to form dyes falling within the scope of the present invention. An amine of this type is 2,6-chloro-1,4-phenylenediamine.

Diamines in which both amino groups are diazotized to form tetrazo compounds will also condense with amino and hydroxy aromatic acyl dicyandiamides. An example of this type in which benzidine is employed is shown in the specific examples. Other amines of this class are p-phenylenediamine, o-tolidine, o-dianisidine, 4,4'-diaminostilbene, 4,4'-diaminodiphenylamine, 1,5-diaminonaphthalene and the like.

Diazo and tetrazo compounds derived from aromatic amines of the heterocyclic type can also be reacted with amino and hydroxy aromatic acyl dicyandiamides. Typical of these heterocyclic amines are 2-amino-carbazole, 3,6-diamino-carbazole, 1-amino-5-fluorobenzothiazole, 2-amino-3-nitrodibenzothiophene, 3-amino-benzo,1,2,4-triazole and 3-amino-(4'-aminobenzo)-1,2,4-triazole.

The coupling of diazotized amines or diazotized aromatic acyl dicyandiamides with coupling components of the class described herein is normally carried out in slightly alkaline medium at low temperatures as in conventional diazoic coupling procedures. In certain cases, however, the coupling is preferably effected in a slightly acid medium. The reaction does not require a critical proportion of reagents but ordinarily the two components are used in substantially equi-molecular proportions. In the preparation of certain tetrazo dyes, however, two molecular proportions of aromatic acyl dicyandiamide are used for each molecular proportion of the tetrazonium reactant.

As previously indicated, dyes may be formed having many different characteristics and generalizations as to the outstanding properties of these products are difficult to make. Their solubility characteristics vary considerably, some being water soluble and some water insoluble. Most of them are soluble in dilute alkalis and difficultly soluble in acids. In general they are soluble in organic solvents such as pyridine, dioxane, monomethyl and monoethyl ether of ethylene glycol, etc.

The preparation of a typical aromatic acyl dicyandiamide and the preparation of representative dyestuffs from these aromatic acyl dicyandiamides will now be illustrated in the following specific examples. It should be understood, of course, that the invention is not limited to the particular dyestuffs described therein or the particular details of the process set forth. All parts are by weight unless otherwise indicated.

*Example 1*

185 parts of p-nitrobenzoyl chloride was dissolved in 396 parts of acetone and added to a cold mixture of 306 parts of 50% sodium hydroxide, 100 parts of dicyandiamide, 396 parts of acetone and 200 parts of water. The temperature was kept at 5–10° C. and the addition was complete in a half-hour. The mixture was then diluted with water, neutralized and filtered. The material was then purified by dissolving in an excess of potassium hydroxide solution and cooling, whereupon the potassium salt of p-nitrobenzoyl dicyandiamide was precipitated. The acyl dicyandiamide was recovered from its salt by dissolving in water and neutralizing with hydrochloric acid.

955 parts of $Fe_2SO_4 \cdot 7H_2O$ was dissolved in 1500 parts of water and the solution heated to refluxing temperatures with stirring. In the meantime 1250 parts of water was heated almost to boiling, 90 parts of concentrated ammonium hydroxide was added and then 100 parts of p-nitrobenzoyldicyandiamide was added. This latter solution was added to the boiling ferrous sulfate solution followed by sufficient ammonium hydroxide (about 450 parts) to make the mixture faintly alkaline. Boiling was continued for 10 minutes and the mixture was then cooled in an ice bath. The solution was filtered to remove insoluble material which was extracted with dilute alkali to remove the p-aminobenzoyldicyandiamide contained therein. Upon neutralization of the alkaline solution p-aminobenzoyldicyandiamide was obtained as a pale yellow material decomposing when heated at 235–237° C.

25 parts of p-aminobenzoyldicyandiamide was dissolved in a solution of 54 parts of 10% sodium hydroxide and 100 parts of water and poured slowly into a water-acid solution containing 235 parts of 10% hydrochloric acid and 900 parts of water with stirring at 5° C. A solution of 17 parts of sodium nitrite in 100 parts of water was added slowly to the above until a theoretical amount of sodium nitrite had been added, i. e. about 60 parts of the sodium nitrite solution. After 20 minutes a small amount of dilute sodium sulfamate solution was added until the samples of the reaction mixture were negative to the starch-potassium iodide test.

The neutralized solution was then poured into 27.2 parts of α-naphthyl amine sulfonic acid, 54 parts of 10% sodium hydroxide and 49.2 parts of sodium acetate in 1000 parts of water. A red dye precipitated immediately. After 4 to 5 hours of stirring the dye was filtered, washed and vacuum dried. The product was believed to have the following formula

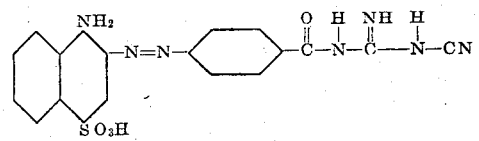

The dry dye was black in color, insoluble in dilute acid but easily soluble in dilute alkalis with a red color.

*Example 2*

25 parts of p-aminobenzoyldicyandiamide was dissolved in a solution of 54 parts of 10% sodium hydroxide and 100 parts of water and poured slowly into a water-acid solution containing 235 parts of 10% hydrochloric acid and 900 parts of water with stirring at 5° C. A solution of 17 parts of sodium nitrite in 100 parts of water was added slowly to the above until a theoretical amount of sodium nitrite had been added, i. e. about 60 parts of the sodium nitrite solution. After 20 minutes a small amount of dilute sodium sulfamate solution was added until the samples of the reaction mixture were negative to the starch-potassium iodide test.

The neutralized solution was then poured into a solution containing 19.4 parts of β-naphthol, 54 parts of 10% sodium hydroxide and 41.2 parts of sodium carbonate in 1000 parts of water. After 4 to 5 hours of stirring the dye which had precipitated out was filtered, washed and vacuum dried. The product was believed to have the following formula

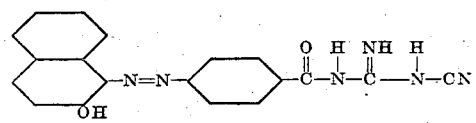

The red dye dried to a black solid, which dissolved in alkali with a red color but was insoluble in dilute acid.

Example 3

25 parts of p-aminobenzoyldicyandiamide was diazotized as in the preceding example.

The neutralized solution was then poured into a faintly alkaline solution of 13.1 parts of dimethylaniline in 1000 parts of water. After 4 to 5 hours of stirring the dye which had precipitated out was filtered, washed and vacuum dried. The product was thought to have the following structure

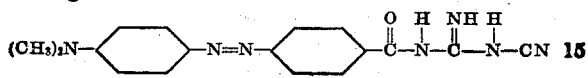

The dry dye was bright brick red, easily soluble in dilute hydrochloric acid.

Example 4

20.3 parts of crude m-aminobenzoyldicyandiamide was dissolved in a solution of 88.8 parts of 10% sodium hydroxide and 100 parts of water and poured slowly into a water-acid solution containing 158 parts of 10% hydrochloric acid and 100 parts of water with stirring at 5° C. A solution of 6.9 parts of sodium nitrite in 50 parts of water was added slowly to the above until the starch-potassium iodide test was faintly positive. This required the addition of about 75% of the nitrite solution.

The neutralized solution was then poured into a solution of 24 parts of 1-amino-8-hydroxy-3,6-disulfonaphthalene, 49 parts of 10% sodium hydroxide and 4.1 parts of sodium acetate in 750 parts of water. A scarlet-red dye precipitated immediately. After 4 to 5 hours of stirring the dye was filtered washed and vacuum dried. The product was believed to have the following formula

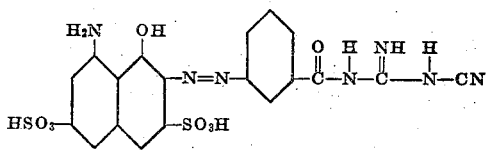

The dye was insoluble in acid solution but soluble in alkali.

A somewhat similar dye may also be prepared by using two molar quantities of the diazotized m-aminobenzoyldicyandiamide for each molar quantity of the 1-amino-8-hydroxy-3,6-disulfonaphthalene. In this case the product is believed to have the following formula

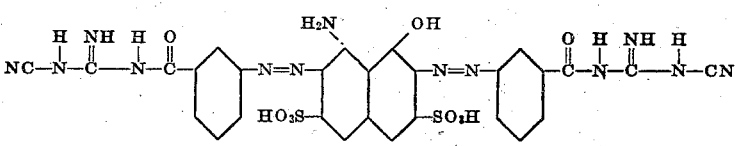

Example 5

10.3 parts of m-aminobenzoyldicyandiamide was diazotized as in the preceding example.

13.1 parts of 2-hydroxynaphthanilide was suspended in a solution of 19 parts of 10% sodium hydroxide and 5.1 parts of sodium carbonate in 750 parts of water. The diazotized m-aminobenzoyldicyandiamide solution was then poured slowly into the suspension. After stirring for one-half hour in the cold the alkali was neutralized and the orange-red dye filtered. The product was believed to have the following formula

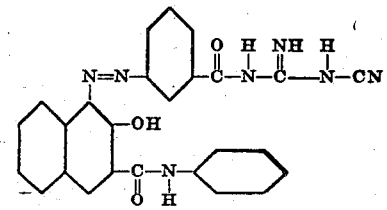

The orange-red dye was insoluble in acid and soluble in alkali to give a red color.

Example 6

25 parts of p-aminobenzoyldicyandiamide was dissolved in a solution of 88.8 parts of 10% sodium hydroxide and 100 parts of water and poured slowly into a water-acid solution containing 204 parts of 10% hydrochloric acid and 100 parts of water with stirring at 5° C. A solution of 6.9 parts of sodium nitrite in 100 parts of water was added slowly to the above until the starch-potassium iodide test was faintly positive, this required the addition of about 75% of the nitrite solution.

17.4 parts of 1-phenyl-3-methyl-5-pyrazolone was suspended in a solution of 88 parts of 10% sodium hydroxide in 1000 parts of water. The diazotized p-aminobenzoyldicyandiamide was poured slowly into the suspension, the pH was adjusted to 7.5 to 8.0 and the reaction mixture stirred 2 to 3 hours in an ice bath. The mixture was neutralized and the orange dye filtered, washed and dried. The dye was believed to have the following structure

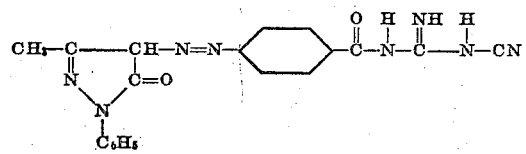

The dried dye was an orange-brown solid, insoluble in acid but soluble in alkali to give a reddish-orange color.

Example 7

25 parts of p-aminobenzoyldicyandiamide was diazotized as in the preceding example.

15.5 parts of citrazinic acid was added to a solution of 88 parts of 10% sodium hydroxide in 1500 parts of water. The diazotized p-aminobenzoyldicyandiamide was added to the citrazinic acid solution and sufficient sodium acetate added to bring the pH to 4.5. After standing for three hours in an ice bath the yellow-brown dye which formed was filtered and washed. The dye was thought to have the following formula

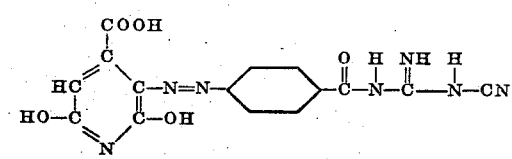

The yellow-brown dye formed a brown suspension in water, was insoluble in acid but soluble in alkali to give a deep red color.

Example 8

18.6 parts of aniline was dissolved in a dilute hydrochloric acid solution made from 236 parts of 10% hydrochloric acid and 250 parts of water. The solution was then cooled to about 5° C. and a solution of 13.8 parts of sodium nitrite in 100 parts of water was added slowly with agitation to the above until a theoretical amount of sodium nitrite had been added. The solution was then treated with dilute sodium sulfamate until the reaction mixture was negative to the starch-potassium iodide test.

50 parts of p-hydroxybenzoyldicyandiamide was dissolved in 11 parts of 10% sodium hydroxide and then poured into a solution of 1600 parts of a sodium carbonate solution containing 100 parts of sodium carbonate. 15 parts of acetic acid was then added with stirring to the acyl dicyandiamide solution. The diazotized aniline prepared as described in the preceding paragraph was added in small amounts over a period of one-half hour to the cold stirred suspension of the acyl dicyandiamide. An orange color was first produced but gradually became a chocolate brown. Although the structure of this material was not definitely established it was believed to be

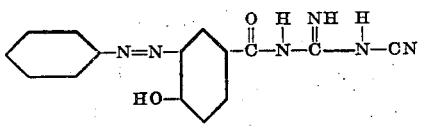

Example 9

18.7 parts of benzidine was dissolved in a dilute hydrochloric acid solution made from 236 parts of 10% hydrochloric acid and 250 parts of water. The solution was then cooled to about 5° C. and a solution of 13.8 parts of sodium nitrite in 100 parts of water was added slowly with stirring to the above until a theoretical amount of sodium nitrite had been added. The solution was then treated with dilute sodium sulfamate until the reaction mixture was negative to the starch-potassium iodide test.

45 parts of m-hydroxyphenoxyacetyldicyandiamide was suspended in a solution of 60 parts of sodium carbonate dissolved in 1000 parts of water. To this suspension was added the solution of diazotized benzidine. The dye formed immediately. When suspended in water the dye was a chocolate-black, while in dry form it was black. The formula of the dye was thought to be

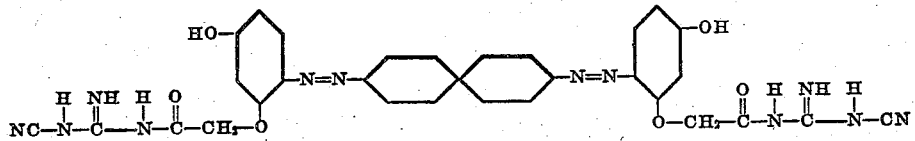

Example 10

16.8 parts of p-aminoacetanilide (89%) was dissolved in 116 parts of 10% hydrochloric acid. The solution was then cooled to about 5° C. and 6.9 parts of sodium nitrite dissolved in water was added slowly with agitation. The solution was then treated with dilute sodium sulfamate solution until the reaction mixture was negative to the starch-potassium iodide test.

22.4 parts of m-hydroxyphenoxyacetyldicyandiamide was suspended in a solution of 44 parts of 10% sodium hydroxide and 20 parts of sodium carbonate in 1000 parts of water. To this suspension was added the diazonium salt prepared above and a red-brown dye formed immediately. After stirring one-half hour the pH was adjusted to 6 and the dye filtered. This dye was believed to have the following formula

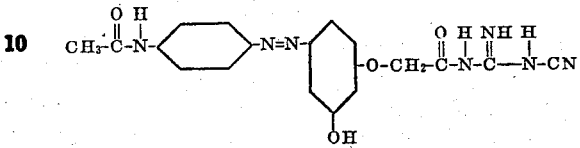

The dye was insoluble in acid but soluble in alkali to give a red color.

Example 11

15.8 parts of m-nitroaniline was suspended in 236 parts of 10% hydrochloric acid. The suspension was cooled to 5° C. and 7.5 parts of solid sodium nitrite was added in 1 to 2 minutes. A clear solution resulted.

22.4 parts of m-hydroxyphenoxyacetyldicyandiamide was suspended in a solution of 44 parts of 10% sodium hydroxide and 70 parts of sodium carbonate in 1000 parts of water. To this suspension was added the diazonium solution obtained above. An orange red dye formed immediately. This dye was thought to have the formula

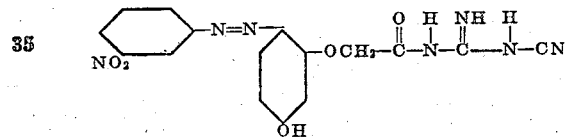

The orange red dye was insoluble in acid but soluble in alkali to give a red color.

Example 12

16.2 parts of 2,5-dichloroaniline was dissolved on heating in 236 parts of 10% hydrochloric acid. The solution was then cooled to 5° C. and 7.5 parts of solid sodium nitrite added to obtain a clear solution. After 15 minutes a trace of gum was removed by filtration.

22.4 parts of m-hydroxyphenoxyacetyldicyandiamide was suspended in a solution of 88 parts of 10% sodium hydroxide and 40 parts of sodium carbonate in 1000 parts of water. To this suspension was added the filtered diazonium solution prepared above. A brown dye formed immediately. This dye was though to have the following structure

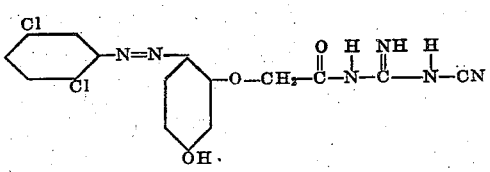

This dye is soluble in alkali to give a red solution.

I claim:

1. Azo dyestuffs of the general formula

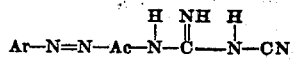

in which Ar is an aromatic radical and Ac is an aromatic acyl radical of the group consisting of acyl radicals of the benzene and naphthalene series.

2. Azo dyestuffs of the general formula

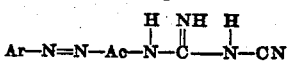

in which Ar is an aromatic radical and Ac is an aromatic carbonyl radical of the group consisting of carbonyl radicals of the benzene and naphthalene series.

3. Azo dyestuffs of the general formula

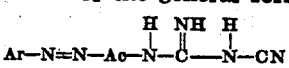

in which Ar is an aromatic radical and Ac is an aromatic sulfonyl radical of the group consisting of sulfonyl radicals of the benzene and naphthalene series.

4. Azo dyestuffs of the general formula

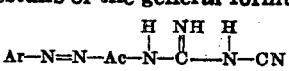

in which Ar is an aromatic radical and Ac is a benzoyl radical.

5. An azo dyestuff having the formula

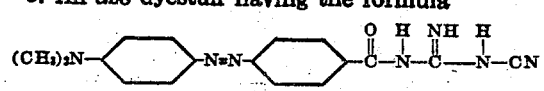

6. Azo dyestuffs of the general formula

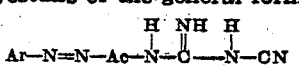

in which Ar is an aromatic radical of the benzene series and Ac is an aromatic acyl radical of the group consisting of acyl radicals of the benzene and naphthalene series.

7. Azo dyestuffs of the general formula

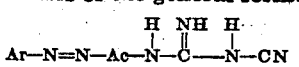

in which Ar is an aromatic radical of the naphthalene series and Ac is an aromatic acyl radical of the group consisting of acyl radicals of the benzene and naphthalene series.

8. An azo dyestuff having the formula

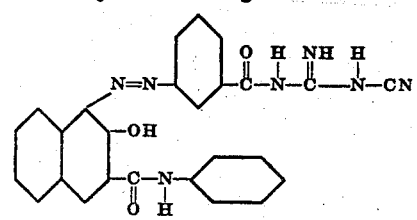

9. A method of preparing azo dyestuffs of the general formula

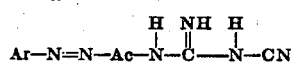

in which Ar is an aromatic radical and Ac is an aromatic acyl radical of the group consisting of acyl radicals of the benzene and naphthalene series, which comprises the steps of diazotizing an amino aromatic acyl dicyandiamide and coupling it to an aromatic coupling component.

10. A method of preparing azo dyestuffs of the general formula

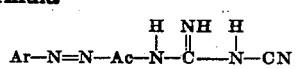

in which Ar is an aromatic radical and Ac is a benzene carbonyl radical, which comprises the steps of diazotizing an amino benzene carbonyl dicyandiamide and coupling it to an aromatic coupling component.

11. A method of preparing azo dyestuffs of the general formula

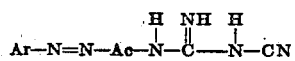

in which Ar is an aromatic radical and Ac is a benzene sulfonyl radical, which comprises the steps of diazotizing an amino benzene sulfonyl dicyandiamide and coupling it to an aromatic coupling component.

12. A textile fabric dyed with a dyestuff of the formula set forth in claim 1.

JACK T. THURSTON.